(12) United States Patent
Sharp

(10) Patent No.: US 8,290,882 B2
(45) Date of Patent: Oct. 16, 2012

(54) EVALUATING DECISION TREES ON A GPU

(75) Inventor: Toby Sharp, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1042 days.

(21) Appl. No.: 12/248,536

(22) Filed: Oct. 9, 2008

(65) Prior Publication Data

US 2010/0094800 A1 Apr. 15, 2010

(51) Int. Cl.
*G06E 1/00* (2006.01)
(52) U.S. Cl. ............................................ 706/10; 706/26
(58) Field of Classification Search .................. 382/226; 706/10
See application file for complete search history.

(56) References Cited

U.S. PATENT DOCUMENTS

| | | | |
|---|---|---|---|
| 6,009,199 A | 12/1999 | Ho | |
| 7,203,360 B2 | 4/2007 | Lee et al. | |
| 7,203,669 B2 | 4/2007 | Lienhart et al. | |
| 7,548,892 B2* | 6/2009 | Buck et al. | 706/12 |
| 2008/0050014 A1 | 2/2008 | Bradski et al. | |
| 2008/0075361 A1 | 3/2008 | Winn et al. | |
| 2008/0075367 A1 | 3/2008 | Winn et al. | |
| 2008/0273693 A1* | 11/2008 | Au et al. | 380/28 |
| 2009/0135180 A1* | 5/2009 | Li | 345/420 |
| 2009/0153556 A1* | 6/2009 | Nam et al. | 345/421 |
| 2010/0061603 A1* | 3/2010 | Mielekamp et al. | 382/128 |
| 2010/0080429 A1* | 4/2010 | Li | 382/131 |
| 2012/0069003 A1* | 3/2012 | Birkbeck et al. | 345/419 |
| 2012/0154373 A1* | 6/2012 | Finocchio et al. | 345/419 |

FOREIGN PATENT DOCUMENTS

WO WO2007079207 A2 7/2007

OTHER PUBLICATIONS

Maria Ferre, Anna Puig, and Dani Tost. 2006. Decision trees for accelerating unimodal, hybrid and multimodal rendering models. Vis. Comput. 22, 3 (Mar. 2006), 158-167.*
Quinlan, J. c4.5, "Programs for Machine Learning", Morgan Kaufmann, California (1992), 3 pages.
"Real-Time Glow", GPU Gems: Programming Techniques, Tips and Tricks for Real-Time Graphics, Chapter 21, retrieved on the internet on Jan. 2, 2009 at <<http://http.developer.nvidia.com/GPUGems/gpugems_ch21.html>>.

(Continued)

*Primary Examiner* — Jeffrey A Gaffin
*Assistant Examiner* — David H Kim
(74) *Attorney, Agent, or Firm* — Lee & Hayes, PLLC

(57) ABSTRACT

Methods and apparatus for evaluating decision trees on a GPU are described. In an embodiment, the structure of a decision tree is converted into a 2D "tree" array with each row representing a node in the tree. Each row comprises details of any child nodes and the parameters which are required to perform the binary test at the node. A pixel shader can then be used to evaluate the decision tree in parallel for each input data point in an input array by navigating through rows in the 2D tree array. For each row, data is read from the input array dependent upon the parameters in the row and the shader moves to another row dependent upon the result of the binary test. On reaching a row which represents a leaf node, the pixel shader outputs evaluation results, such as a leaf node index or a probability distribution over classes.

20 Claims, 12 Drawing Sheets

OTHER PUBLICATIONS

Ali, "Tree Detection using Color, and Texture Cues for Autonomous Navigation in Forest Environment", retrieved on Aug. 21, 2008 at <<http://www.cs.umu.se/education/examina/Rapporter/WajidAli.pdf>>, Umea University, Jun. 2006, 2 cover pages, pp. i-x and pp. 1-79.

Amara, et al., "A GPU Framework for the Visualization and On-the-Fly Amplification of Real Terrains", retrieved on Aug. 21, 2008 at <<http://hal.archives-ouvertes.fr/docs/00/26/51/25/PDF/Revue_internationale_ISVC_2007.pdf>>, ISVC, Springer-Verlag, 2007, pp. 586-597.

Amit, et al., "Shape Quantization and Recognition with Randomized Tree", retrieved on Aug. 21, 2008 at <<http://www.stat.uchicago.edu/~amit/Papers/shape_rec.ps.gz>>, 1996, pp. 1-56.

Apostoloff, et al., "Who are you?—real-time person identification", retrieved on Aug. 21, 2008 at <<http://www.robots.ox.ac.uk/~vgg/publications/papers/apostoloff07.pdf>>, Department of Engineering Science, University of Oxford, 10 pages.

Blelloch, "Prefix Sums and Their Applications", retrieved on Aug. 21, 2008 at <<http://www.cs.cmu.edu/~guyb/papers/Ble93.pdf>>, School of Computer Science, Carnegie Mellon University, Pittsburgh, PA, pp. 35-60.

Bosch, et al., "Image Classification using Random Forests and Ferns", retrieved on Aug. 21, 2008 at <<http://ieeexplore.ieee.org/iel5/4408818/4408819/04409066.pdf?tp=&isnumber=&arnumber=4409066>>, IEEE 2007, 8 pages.

Breiman, "Random Forests", retrieved on Aug. 21, 2008 at <<http://oz.berkeley.edu/users/breiman/randomforest2001.pdf>>, Statistics Department, University of California, Berkeley, CA, Jan. 2001, pp. 1-33.

Brunton, et al., "Belief Propagation on the GPU for Stereo Vision", retrieved on Aug. 21, 2008 at <<http://ieeexplore.ieee.org/iel5/10921/34370/01640431.pdf?tp=&isnumber=&arnumber=1640431>>, Proceedings of the 3rd Canadian Conference on Computer and Robot Vision (CRV 06), 2006 IEEE, 6 pages.

Chipman, et al., "Bayesian Ensemble Learning", retrieved on Aug. 21, 2008 at <<http://www-stat.wharton.upenn.edu/~edgeorge/Research_papers/bel-nips.pdf>>, 8 pages.

Deselaers, et al., "Incorporating On-demand Stereo for Real Time Recognition", retrieved on Aug. 21, 2008 at <<http://ieeexplore.ieee.org/iel5/4269955/4269956/04270161.pdf?tp=&isnumber=&arnumber=4270161>>, IEEE 2007, 8 pages.

Felzenszwalb, et al., "Efficient Belief Propagation for Early Vision", retrieved on Aug. 21, 2008 at <<http://ieeexplore.ieee.org/iel5/9183/29133/01315041.pdf?tp=&isnumber=&arnumber=1315041>>, Proceedings of the 2004 IEEE Computer Society Conference on Computer Vision and Pattern Recognition (CVPR 04), IEEE 2004, 8 pages.

Fernando, et al., "Programming Graphics Hardware", retrieved on Aug. 21, 2008 at <<http://www.daimi.au.dk/~mosegard/GPGPU_E04Material/EG_04_TutorialNotes.pdf>>, NVIDIA Corporation, Eurographics Association, 2004, pp. 1-17.

Gumbau, et al., "Fast GPU-Based Normal Map Generation for Simplified Models", retrieved on Aug. 21, 2008 at <<http://wscg.zcu.cz/WSCG2006/Papers_2006/Poster/E13-full.pdf>>, WSCG, Science Press, 2006, 2 pages.

Hensley, et al., "Fast Summed-Area Table Generation and its Applications", retrieved on Aug. 21, 2008 at <<http://www.cs.unc.edu/~hensley/Publications/pdf/hensley_eg05_electronic.pdf>>, EUROGRAPH1CS 2005/ M. Alexa and J. Marks, vol. 24 (2005), No. 3, 9 pages.

James, et al., "Real-Time Glow", retrieved on Aug. 21, 2008 at <<http://http.developer.nvidia.com/GPUGems/gpugems_ch21.html>>, 12 pages.

Lepetit, et al., "Keypoint Recognition Using Randomized Trees", retrieved on Aug. 21, 2008 at <<http://ieeexplore.ieee.org/iel5/34/34764/01661548.pdf?tp&isnumber=&arnumber=1661548>>, IEEE Transactions on Pattern Analysis and Macine Intelligence, vol. 28, No. 9, Sep. 2006, pp. 1465-1479.

Mangalvedkar, "GPU-Assisted Rendering of Large Tree-Shaped Data Sets", retrieved on Aug. 21, 2008 at <<http://www.ohiolink.edu/etd/send-pdf.cgi/Mangalvedkar%20Pallavi%20Ramachandra.pdf?acc_num=wright1195491112>>, Wright State University, 2007, pp. i-ix and 1-55.

Moosmann, et al., "Fast Discriminative Visual Codebooks using Randomized Clustering Forests", retrieved on Aug. 21, 2008 at http://eprints.pascal-network.org/archive/00002438/01/nips.pdf>>, 7 pages.

Nowak, et al., "Learning Visual Similarity Measures for Comparing Never Seen Objects", retrieved on Aug. 21, 2008 at <<http://ieeexplore.ieee.org/iel5/4269955/4269956/04269994.pdf?tp=&isnumber=&arnumber=4269994>>, IEEE 2007, 8 pages.

Ozuysal, et al., "Fast Keypoint Recognition in Ten Lines of Code", retrieved on Aug. 21, 2008 at <<http://ieeexplore.ieee.org/iel5/4269955/4269956/04270148.pdf?tp=&isnumber=&arnumber=4270148>>, Computer Vision Laboratory, Switzerland, IEEE 2007, 8 pages.

Quinlan, et al., "Induction of Decision Trees", retrieved on Aug. 21, 2008 at <<http://www.cs.toronto.edu/~roweis/csc2515-2006/readings/guinlan.pdf>>, Machine Learning 1:81-106, 1986, Kluwer Academic Publishers 1986, Boston-Manufactured in The Netherlands, pp. 81-106.

Scheuermann, et al., "Efficient Histogram Generation Using Scattering on GPUs", retrieved on Aug. 21, 2008 at <<http://delivery.acm.org/10.1145/1240000/1230105/p33-scheuermann.pdf?key1=1230105&key2=6233939121&coll=GUIDE&dl=GUIDS&CFID=185188&CFTOKEN=73292591 5>>, 13D 2007, Seattle, WA., Apr. 30-May 2, 2007, pp. 33-38.

Shotton, et al., "Semantic Texton Forests for Image Categorization and Segmentation", retrieved on Aug. 21, 2008 at <<http://jamie.shotton.org/work/publications/cvpr08.pdf>>, Toshiba Corporate R&D Center, Japan and Department of Engineering, University of Cambridge, UK, 8 pages.

Shotton, et al., "TextonBoost: Joint Appearance, Shape and Context Modeling for Multi-Class Object Recognition and Segmentation", retrieved on Aug. 21, 2008 at <<http://jamie.shotton.org/work/publications/eccv06.pdf>>, publicly available at http://research.microsoft.com/vision/cambridge/recognition/.

Steinkraus, et al., "Using GPUs for Machine Learning Algorithms", retrieved on Aug. 21, 2008 at <<http://ieeexplore.ieee.org/iel5/10526/33307/01575717.pdf?tp=&isnumber=&arnumber=1575717>>, Proceedings of the 2005 Eight International Conference on Document Analysis and Recognition (ICDAR 05), 2005 IEEE, 6 pages.

Viola, et al., "Robust Real-Time Face Detection", retrieved on Aug. 21, 2008 at <<http://www.stat.uchicago.edu/~amit/19CRS/DEA/cascade_face_detection.pdf>>, International Journal of Computer Vision 57(2), 137-154, 2004, Kluwer Academic Publishers 2004, The Netherlands, pp. 137-154.

Winn, et al., "Object Categorization by Learned Universal Visual Dictionary", retrieved on Aug. 21, 2008 at <<http://ieeexplore.ieee.org/iel5/10347/32976/01544935.pdf?tp=&isnumber=&arnumber=1544935>>, Proceedings of the Tenth IEEE International Conference on Computer Vision (ICCV 05), 2005 IEEE, pp. 1-8.

Winn, et al., "Object Class Recognition at a Glance", retrieved on <<http://johnwinn.org/Publications/papers/WinnCriminisi_cvpr2006_video.pdf>>, Microsoft Research Ltd., Cambridge, UK, 1 page.

Yang, et al., "Multi-Resolution Real-Time Stereo on Commodity Graphics Hardware", retrieved on Aug. 21, 2008 at <<http://ieeexplore.ieee.org/iel5/8603/27265/01211356.pdf?tp=&isnumber=&arnumber=1211356>>, Proceedings of the 2003 IEEE Computer Society Conference on Computer Vision and Pattern Recognition (CVPR 03), pp. 1-7.

Yin, et al., "Tree-based Classifiers for Bilayer Video Segmentation", retrieved on Aug. 21, 2008 at <<http://ieeexplore.ieee.org/iel5/4269955/4269956/04270033.pdf?tp=&isnumber=&arnumber=4270033>>, IEEE 2007, 8 pages.

* cited by examiner

EVALUATING DECISION TREES ON A GPU

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Decision trees and decision forests (which are collections of many trees) are used in machine learning applications to make decisions or predictions based on input data, which may be observations about an item. The decision trees are created by learning from large sets of training data which may have been manually classified or otherwise analyzed to produce 'ground truth' data. An example of a machine learning application may be object recognition in images or videos. In such an example, the ground truth data may comprise labeled images. As decision forests contain many decision trees, the time and computational power taken to evaluate a forest can be large which limits their use, particularly in real time applications. Training decision trees is also a very intensive process and generating a decision tree can take days or weeks, depending on the complexity of the particular machine learning application.

CPUs (Central Processing Units) are currently used to train and evaluate decision trees. CPUs are designed to have general processing capability and as a result are very flexible in their application and the way they can be programmed; however, they are not designed for parallel computation. Many desktop computers also contain a GPU (Graphics Processing Unit) which has a highly parallel structure and is designed specifically to perform graphics operations, including rendering polygons and texture mapping. Recent GPUs include programmable stages known as shaders: a vertex shader and a pixel shader. The vertex shader is used to modify the vertices of a polygon, e.g. moving a vertex to change the shape of an object. The pixel (or fragment) shader reads and writes pixel values and is used to change the appearance of a pixel (i.e. its color) based on parameters such as lighting, shading etc. By performing the graphics operations in dedicated hardware (i.e. the GPU) rather than in the CPU, the operations can be performed much more quickly. However, as the GPU is not designed for general use, it is not flexible like the CPU and has a number of limitations. This has the result that it is not straightforward to design systems and algorithms that can make use of the GPU for other, non-graphics operations.

The embodiments described below are not limited to implementations which solve any or all of the disadvantages of known methods of evaluating decision trees.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and apparatus for evaluating decision trees on a GPU are described. In an embodiment, the structure of a decision tree is converted into a 2D "tree" array with each row representing a node in the tree. Each row comprises details of any child nodes and the parameters which are required to perform the binary test at the node. A pixel shader can then be used to evaluate the decision tree in parallel for each input data point in an input array by navigating through rows in the 2D tree array. For each row, data is read from the input array dependent upon the parameters in the row and the shader moves to another row dependent upon the result of the binary test. On reaching a row which represents a leaf node, the pixel shader outputs evaluation results, such as a leaf node index or a probability distribution over classes.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although many of the following examples are described and illustrated herein as being implemented in a computer vision system, the system described is provided as an example and not a limitation. As those skilled in the art will appreciate, the present examples are suitable for application in a variety of different types of machine learning systems and computer vision is just one example of an application of the methods described below.

As described above, the GPU is not designed for general use and has a number of limitations, such as the ability to only deal with 1D, 2D and 3D arrays called textures (and tree structures are not available). Additionally, the performance of a GPU is sensitive to flow control operations and any branching (e.g. using flow control statements such as if, while and goto) allowed by a GPU is limited and is bad for performance. As a result it is not straightforward to evaluate a decision tree on a GPU.

Figure 1:
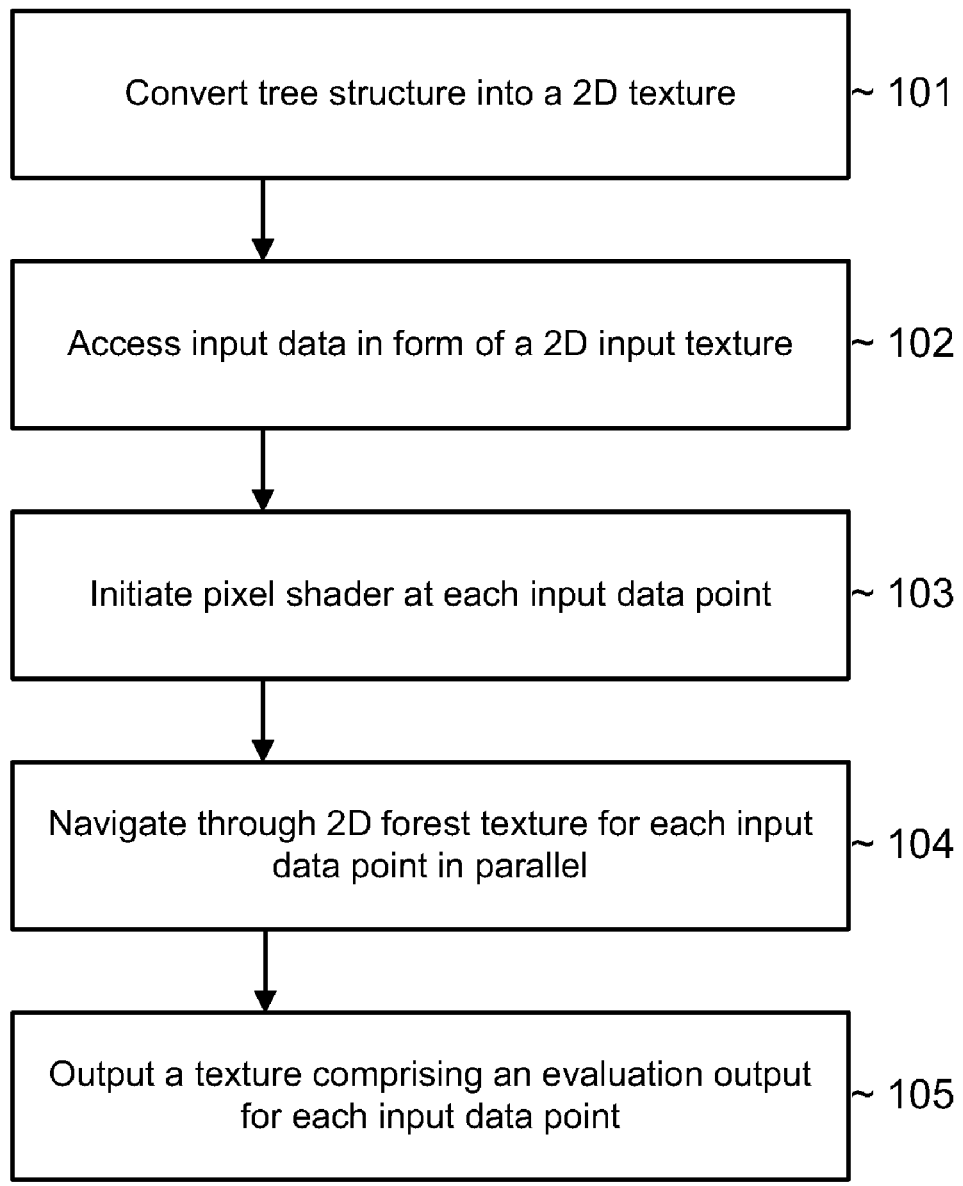
FIG. 1 is a flow diagram of a method of evaluating decision trees using a GPU.

FIG. 1 is a flow diagram of a method of evaluating decision trees using a GPU. This method enables exploitation of the parallelism of a GPU and significantly reduces the amount of time taken to evaluate a decision tree compared to methods implemented on a CPU (e.g. a time reduction of about 99%). The decision tree, or multiple decision trees (the decision forest), is converted into a texture (block 101), which is referred to herein as the 'forest texture'. This forest texture is described herein as being a 2D texture by way of example only and may alternatively comprise a different data structure, e.g. a table, node array or texture with a different number of dimensions. The input data is also formatted as a 2D texture, referred to herein as the 'input texture' and this may require conversion of the input data into this format, as described in more detail below. In some applications, e.g. where the input data is image data, it may not be necessary to format the input data as the data may already be in the form of a 2D array. The tree conversion (in block 101) and data formatting may be performed on a CPU.

Having converted the decision tree, and input data where required, the input texture is accessed (block 102) and a pixel shader is initiated at each input data point within the input texture (block 103). The decision tree is then evaluated by iterating through the forest texture for each input data point in parallel (block 104) to identify an evaluation output corresponding to each input data point. These evaluation outputs are then output as an output texture (block 105). These method blocks are described in more detail below.

Figure 2:
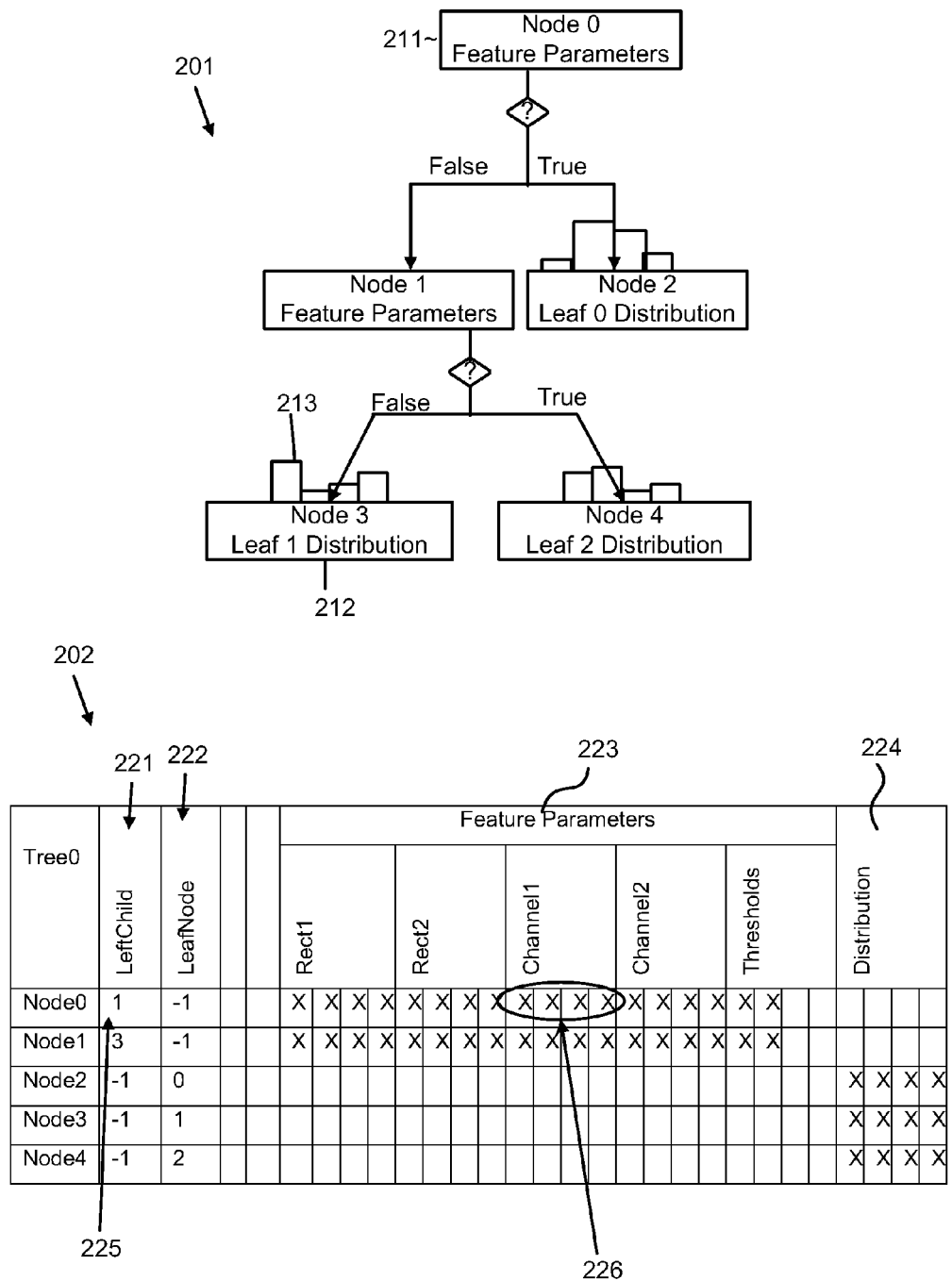
FIG. 2 shows a schematic diagram of an example of a decision tree structure and a corresponding forest texture built from the tree.

FIG. 2 shows a schematic diagram of an example of a decision tree structure 201 and a corresponding forest texture 202 built from the tree (e.g. in block 101). The decision tree structure 201 is a binary tree which contains parameters used in a Boolean test at each parent node 211 (i.e. each node which has two child nodes) and output data at each leaf node 212 (i.e. each node which does not have any children). In the example shown, the output data is a probability distribution over four classes, as represented by the histogram 213 shown above each leaf node. The data associated with the tree structure 201 is laid out into a four-component (RGBA) float texture 202, which is a 7×5 texture in the example shown. In FIG. 2, the 'X's denote values which are used and the empty spaces denote unused values. The forest texture 202 is constructed with each node's data on a separate row in breadth-first order, i.e. node 2 (the right child of node 0) is in the row directly below node 1 (the left child of node 0).

In the example of the forest texture 202 shown in FIG. 2, in the first horizontal position of each row (as indicated by arrow 221), the texture coordinate of the corresponding node's left child is stored. The right child's position may also be stored; however it is not necessary to store this position as the right child occupies the row after the left child (e.g. node 2 occupies the row directly below node 1). A value of '−1' in this position of a row indicates that the particular node does not have any child nodes and is therefore a leaf node. The second horizontal position in each row (as indicated by arrow 222) stores the leaf node index, where the node is a leaf node (e.g. nodes 2, 3 and 4) or alternatively this second horizontal position indicates that the node is not a leaf node using value '−1', (e.g. nodes 0 and 1). It will be appreciated that other values or techniques may be used instead of the value '−1' to indicate a lack of children (in the first horizontal position) and/or that a node is not a leaf node (in the second horizontal position). In further examples, the data about the node and whether it has children may be provided in a different format within the forest texture. The forest texture 202 also contains all the feature parameters necessary to evaluate the Boolean test for the node 223. These parameters may include both the relative positions of input values in the input texture (e.g. 'Rect1' defines the position of a first rectangle relative to an input data point position), which channel in the input texture is used (e.g. R, G, B or A), any operators used in the test (e.g. '<' or '>') and any thresholds which are used. In the example shown in FIG. 2, the parameters do not include any operators because the test used has the same format at each node and is given by: $T_1 < x < T_2$. The two thresholds, $T_1$ and $T_2$, used at each node are defined within the feature parameters.

In addition to storing the leaf node index for each leaf node (in column 222), the required output is also stored 224, where this is different to the leaf node index. In this example, the output is a distribution over class labels, which is learned during training. It will be appreciated that the probability distribution output shown in FIG. 2 is one example of an output mode and many different output modes may be implemented. Further examples of output modes are described below. Furthermore, although FIG. 2 shows the probability distribution being stored within the forest texture, in other examples, the probability distribution (or other required output) may be stored elsewhere and may be indexed by leaf node index, with the output of the pixel shader (in block 105) being the index of the leaf node for each input data point.

To navigate through the tree during evaluation, a pixel shader is used that uses a local 2D node coordinate variable in place of a pointer to the current node and an example of such a shader is shown below. This example shows an HLSL (high level shading language) pixel shader which evaluates a decision tree on each input point without branching. For reasons of clarity, evaluation on multiple and unbalanced trees (e.g. trees where the leaf nodes are not all at the bottom, and some branches may terminate sooner than others, as in the example shown in FIG. 2) are omitted.

```
float4 Evaluate(uniform sampler2D Forest, uniform sampler2D Input,
        uniform float2 PixSize, in float2 TexCoord : TEXCOORD0) :
    COLOR0
{
    float2 NodeCoord = PixSize * 0.5f;
    // Iterate over the levels of the tree, from the root down...
    [unroll] for (int nLevel = 1; nLevel < MAX_DEPTH; nLevel++)
    {
        float LeftChild = tex2D(Forest, NodeCoord).x;
        // Read the feature parameters for this node...
        Parameters Params = ReadParams(Forest, NodeCoord, PixSize);
        // Perform the user-supplied Boolean test for this node...
        bool TestResult = TestFeature(Input, TexCoord, Params);
        // Move the node coordinate according to the result of the
        test...
        NodeCoord.y = LeftChild + TestResult * PixSize.y;
    }
    // Read the output distribution associated with this leaf node...
    return Distribution(Forest, NodeCoord);
}
```

Figure 3:
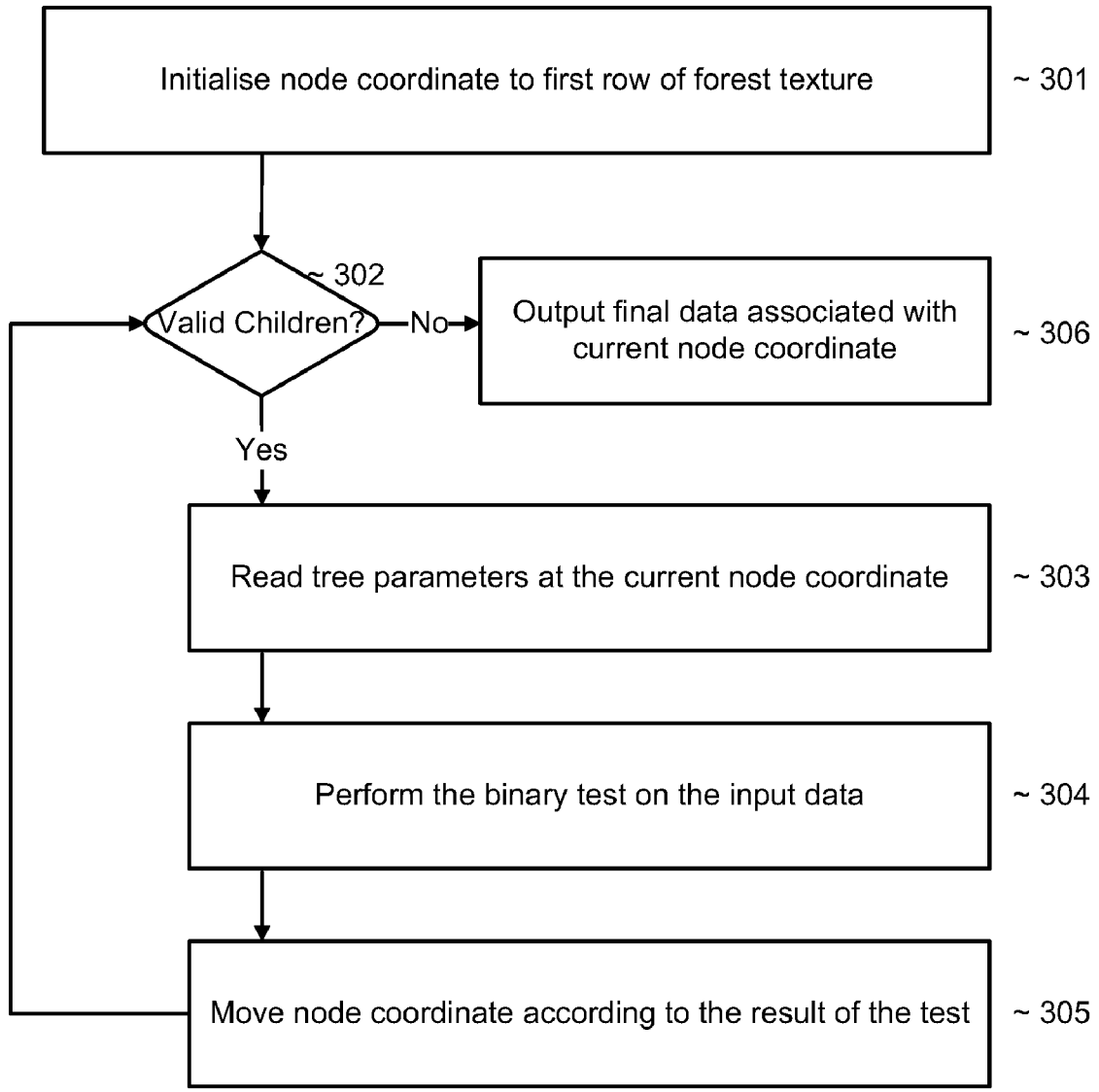
FIG. 3 shows a flow diagram of an example method of operation of a pixel shader to navigate through the forest texture.

FIG. 3 shows a flow diagram of an example method of operation of the pixel shader to navigate through the forest texture (as in block 104 of FIG. 1). The node coordinate variable is initiated at the first row of the forest texture (block 301), which corresponds to the root node, and then starting with the first element in the first row (as indicated by arrow 225) the tree parameters (e.g. left child node, leaf node index and feature parameters) are read (block 303, following 'Yes' in block 302 as the root node will have valid children). The feature parameters are used to determine and evaluate the Boolean test (block 304) on the input data using texture-dependent reads. A texture-dependent read is a read where the position of the data read from the input texture (in order to perform the test) is dependent on the values read from the forest texture. For example, the feature parameter 'Rect1' in the example shown in FIG. 2 provides the relative coordinates of a rectangle of data points (which may be considered as pixels as the input data is formatted as a 2D texture) which are read to perform the binary test for node 0. In such an example, the test may be:

$$\theta_0 < \Sigma I(c_0, R_0) < \theta_1$$

where $\Sigma I(c_0, R_0)$ is the sum of the intensities of the pixels in the rectangle $R_0$ which has a position defined relative to input data point $c_0$. The values $\theta_0, \theta_1$ are the two thresholds.

Having performed the binary test (in block 304), the vertical component of the node coordinate is updated based on the result of the test and the value read from the left child field (block 305). This has the effect of walking down the tree according to the computed features and dependent upon the test results, some rows in the texture will be skipped. If the binary test gives the result 'False' (in the example shown in FIG. 2), the vertical component is updated to the value stored in the left child field and if the binary test gives the result 'True', the vertical component is updated to a value which is one more than the value stored in the left child field (which will be the row corresponding to the right child node). This method is repeated (blocks 302-305) until a row is reached that represents a leaf node in the tree ('No' in block 302 e.g. where there is a leaf index in column 222 instead of value '−1'). When such a row is reached, the output data associated with the leaf (i.e. associated with the current node coordinate) is returned (block 306). In this example, the output data is a distribution, but in other examples this may be the leaf node index.

Figure 4:
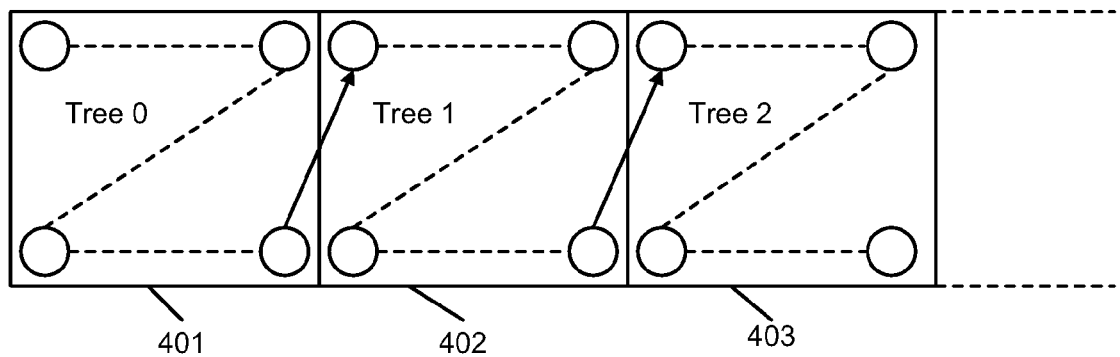
FIG. 4 shows a schematic diagram of an example of a forest texture built from the multiple trees.

The examples described above and shown in FIGS. 2 and 3 relate to a single decision tree. For a forest consisting of multiple trees, the tree textures 401-403 may be tiled horizontally, e.g. as shown in FIG. 4, vertically or in any other arrangement. The forest texture is then navigated (as in block 104) using an outer loop (blocks 501-502) which iterates over the trees in the forest; in a horizontally tiled example (as in FIG. 4) the horizontal component of the node coordinate may be used to address the correct tree, and the vertical component may be used to address the correct node within the tree. When a leaf node is reached in an individual tree ('No' in block 302), a temporary variable is updated based on the current node coordinate (block 503) and once all the trees have been navigated ('Yes' in block 501) the temporary variable becomes the output data (block 504). In an example, the output distribution (as output in block 504) for the forest is the mean of the distributions for each tree (with the mean value, which is stored as the temporary variable, being updated after completion of each tree in block 503). In another example, the result from each tree may be output (e.g. in the ForestLeaves output mode described below).

Figure 5:
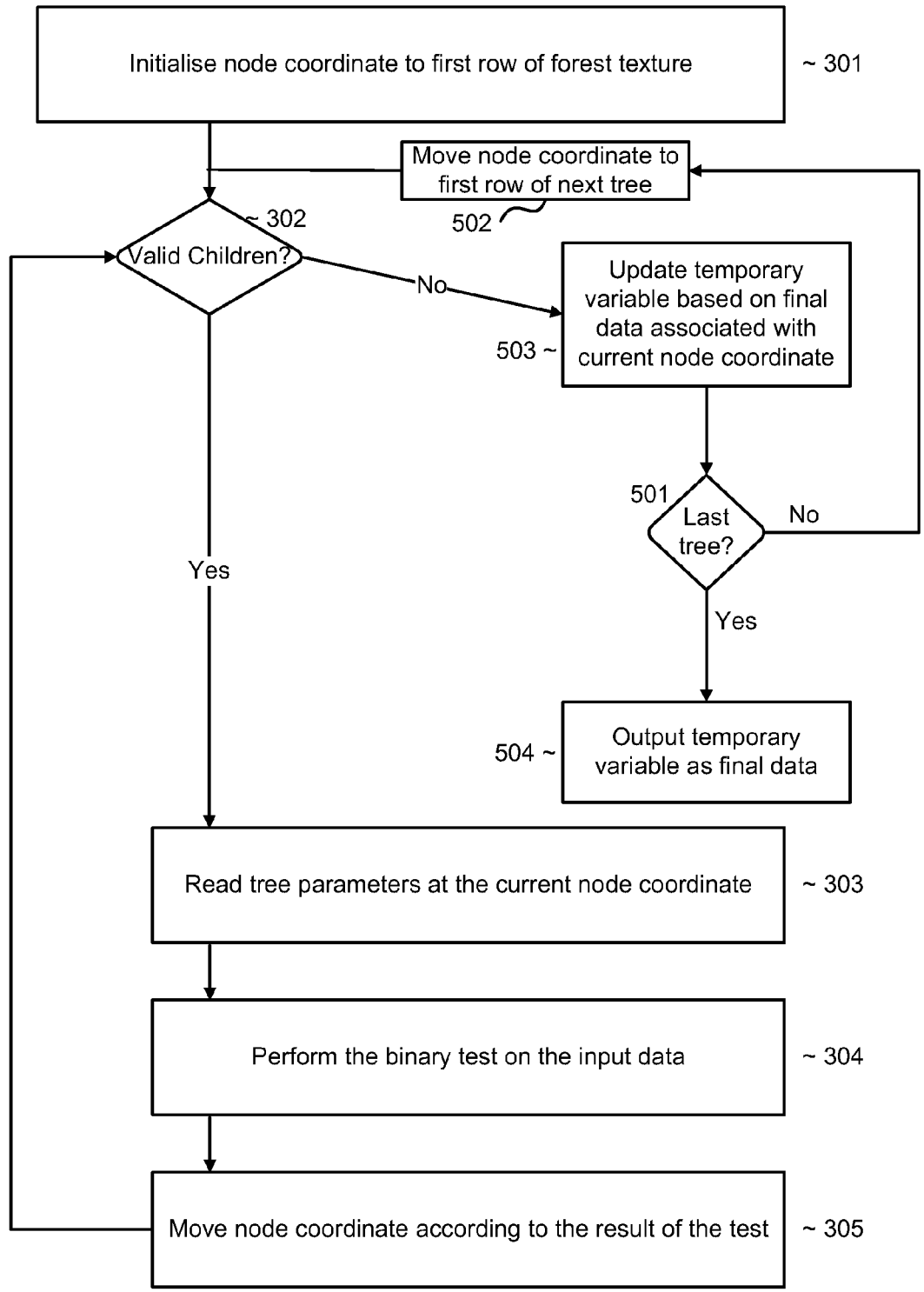
FIG. 5 shows a flow diagram of an example method of operation of a pixel shader to navigate through a forest texture comprising multiple trees.

The methods shown in FIGS. 1, 3 and 5 allows the pixel shader to be non-branching (i.e. it does not contain flow control statements) which results in optimal execution performance.

There may be many different output modes of the evaluation method, particularly where results from multiple trees are combined (e.g. as in FIG. 5). Examples of possible output modes include:

Distribution: Outputs the evaluated distribution over L labels into L output channels ArgMax: Outputs the index of the label with the greatest probability in the evaluated distribution ForestLeaves: Outputs the index of the leaf node reached in each of T trees into T output channels TreeLeaf: Outputs the index of the leaf node reached in the first tree (i.e. this is like ForestLeaves with T=1)

Different pixel shaders may be used to implement different output modes.

The output mode may be selected according to the particular application of the decision tree evaluation. The ArgMax and ForestLeaves modes may, for example, be useful where there are lots of classes as this reduces the size of the output data compared to the Distribution mode. The TreeLeaf mode may also be used in training decision trees, as described below. The output of the ForestLeaves and the TreeLeaf modes may be referred to as a 'leaf image' and comprises a 2D texture containing a leaf node index for each input data point.

Depending on the SDK (Software Development Kit) used to code the method, there may be a limit on the number of output channels that can be used for particular output modes. In such an instance, if more channels are required for label posteriors than a limit that is set on the number of channels, these may be computed using multiple passes from one or more leaf images generated by the ForestLeaves mode. Additionally, where a limit on the number of trees is exceeded, the forest may be divided into a number of smaller forests, each containing no more than the maximum number of trees, and each of the smaller forests may be evaluated in succession. As a result, the methods described herein may be used to handle any number of trees and class labels.

In evaluating the tree/forest (as described above) a rectangle is rendered that covers the size of the input data and the first texture stage is assigned the forest texture. The input data is required in the form of a 2D input texture (e.g. as accessed in block 102) and this input texture is bound to the second texture stage. This sets up the two input textures: the forest texture (the first input) and the input data (the second input).

Figure 6:
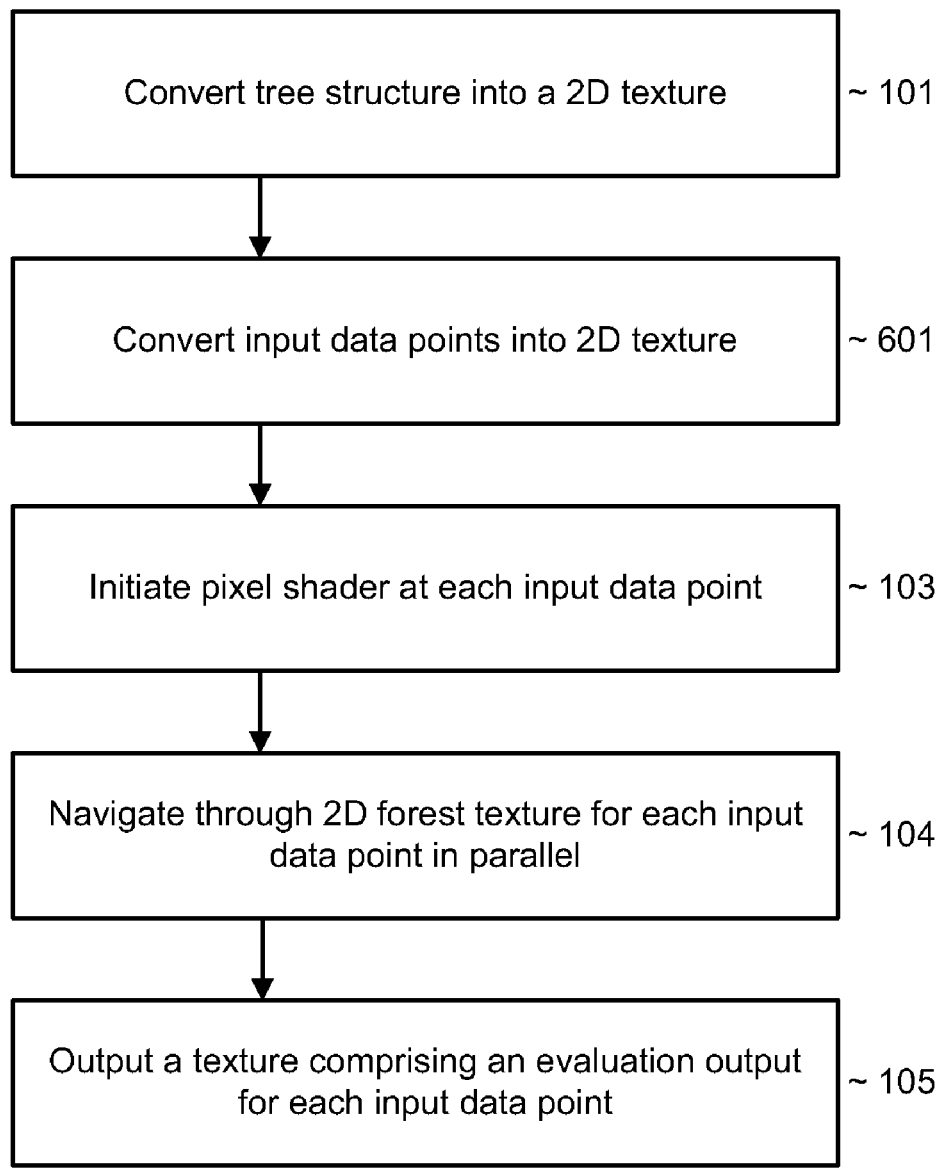
FIG. 6 is a flow diagram of another method of evaluating decision trees using a GPU.

In some examples, the input data may not already be in the form of a 2D array and the method may comprise converting the input data into a 2D texture (block 601), as shown in FIG. 6. Where the input data is a scalar value or a vector with no more than four components, the data can be transformed into a 2D texture (where the up to four components are transformed to the RGBA channels). Where the input data has more than four components (or coefficients), the input data is transformed into a 2D texture where each input data point (which corresponds to a pixel in the texture) has four channels (RGBA). The conversion of the input data (in block 601) may be performed using the method shown in FIG. 7.

Figure 7:
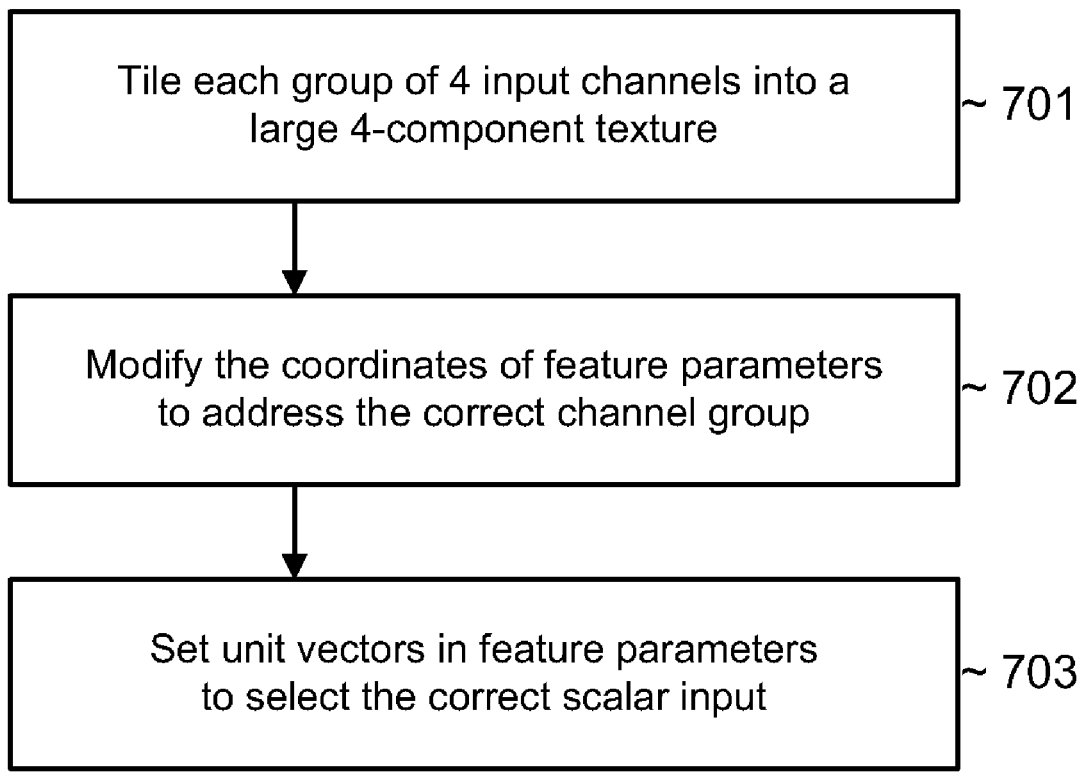
FIG. 7 shows a flow diagram of an example method of conversion of input data.
Figure 8:
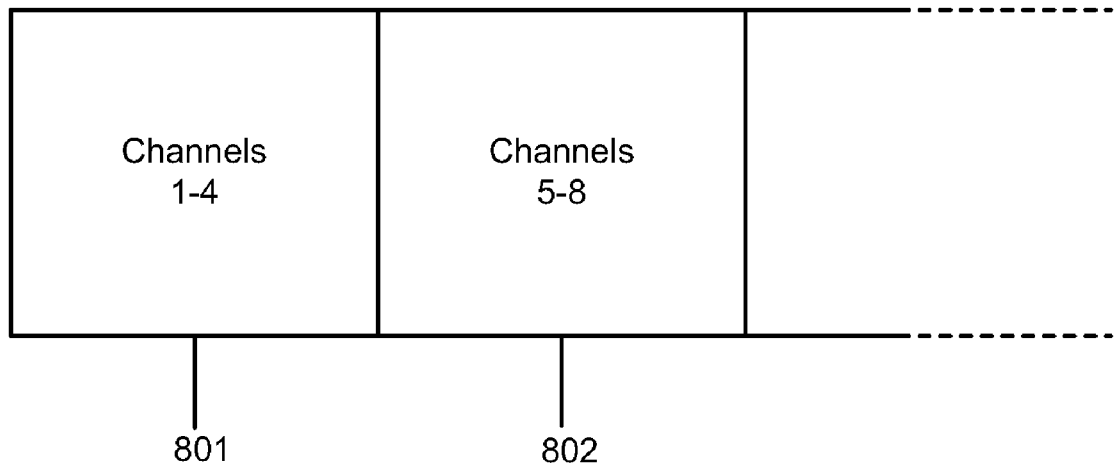
FIG. 8 shows a schematic diagram of an example input texture which may be created using the method of FIG. 7.

FIG. 7 shows a flow diagram of an example method of conversion of input data which may be used where the input data has more than four components/coefficients. Each group of four input channels is tiled into a large four-component texture (block 701), for example as shown in FIG. 8. Whilst FIG. 8 shows one region 801 comprising the data for channels 1-4 and a second region 802 comprising the data for channels 5-8 it will be appreciated that the data may be tiled or interleaved in any suitable manner (e.g. interleaving pixels with data for channels 1-4 and channels 5-8 etc). In order that the forest texture causes the correct input data to be read, the coordinates (or relative coordinates) of the feature parameters (e.g. feature parameters 223 as shown in FIG. 2) are modified to address the correct channel group (block 702). Depending on the manner in which the data is tiled (in block 701), the transformation on the coordinates that is required (in block 702) is different and may be an additive, multiplicative or any other form of coordinate transformation. Unit vectors are also set within the feature parameters (e.g. Channel1 and Channel2 in FIG. 2) in order to select the correct scalar input from the group of four channels (e.g. the ringed group of elements 226 may, for example, be 1, 0, 0, 0 to select the Red channel).

The conversion of the input data points into a 2D texture (in block 601) may involve transformation of the original data based on the feature parameters which are used to perform the Boolean tests at nodes within the decision tree. This transformation may be in addition to (or instead of) the transformation process shown in FIG. 7 and described above. Furthermore, the transformation process may still be used even where the original data is in the form of a 2D array (e.g. as in the specific example described below). As the transformation is based on the particular feature set used, it may be specific to the particular application and to the decision tree which is being evaluated. Examples of data transformation include applying a color space transformation, applying a gradient operator, etc.

The Boolean tests may be designed such that the same code can be executed for all the nodes in a decision tree, varying only the values of the parameters and in particular the thresholds. This enables a non-branching decision evaluation loop to be written. In an example of test generalization, the following Boolean tests may be used within a decision tree:

$$x<6$$

$$x>5$$

and these may be generalized to:

$$\theta_0 < x < \theta_1$$

where the values $\theta_0$, $\theta_1$ are two thresholds. In order to implement the two Boolean tests above using the generalized expression, these thresholds may be set to:

$$\theta_0 = -\infty, \theta_1 = 6$$

$$\theta_0 = 5, \theta_1 = \infty$$

An example of a transformation which may be used for a computer vision application such as object recognition is described below by way of example only. Given a single-channel input image I and a rectangle R, let σ represent the sum: $\sigma(I,R) = \Sigma_{x \in R} I(x)$. The features used in the example are differences of two such sums over rectangles $R_0$, $R_1$ in channels $c_0$, $c_1$ of the input data. The response of a multi-channel image I to a feature $F=\{R_0, c_0, R_1, c_1\}$ is then $\rho(I, F)=\sigma(I([c_0],R_0)-\rho(I, R)<\theta_1$. The Boolean test at a tree node is given by the threshold function θo <integral image. Thus the input data consists of multiple channels of integral images. The integration may also be performed on the GPU (as described below).

Prior to integration, the original sRGB (standard RGB) images are pre-filtered by applying a bank of separable 2D convolution filters (e.g. as introduced in 'Object categorization by learned universal visual dictionary' by Winn, J. M., Criminisi, A., Minka, T. P. and published in ICCV. (2005) 1800-1807) to produce a 16-channel result. This over-complete representation incorporates local texture information at each pixel. The convolution may be performed on the GPU (as described below).

These filters (which may be a 17-filter bank, as introduced in the paper detailed above) may be applied to the non-linear R, G, B and Y channels with the Gaussians are applied to the RGB channels, and the derivative and Laplacian filters being applied to the Y channel (which may also be referred to as the luma). To perform the separable convolution on the GPU, a two-pass technique as described in 'Real-time glow. GPU Gems: Programming Techniques, Tips and Tricks for Real-Time Graphics' by James, G. and O'Rorke, J. (Addison-Wesley (2004) 343-362) may be used. Since a pixel shader is designed to operate on the four texture components in parallel, up to four filters can be applied in one convolution operation. All 17 filters can therefore be applied in 5 convolutions; however, in many implementations the largest scale Laplacian may be omitted such that 16 filters are applied in 4 convolutions.

The sums over rectangular regions may be computed using integral images (as described in 'Robust real-time face detection' by Viola, P. A. and Jones, M. J. and published in the International Journal of Computer Vision (2004) 137-154). Integral images may be computed on the CPU using an intrinsically serial method; however they can alternatively be computed on the GPU using prefix sums. This algorithm is also known as parallel scan or recursive doubling and details of how this can be implemented on the GPU can be found in ° Fast summed-area table generation and its applications' by Hensley, J., Scheuermann, T., Coombe, G., Singh, M., Lastra, A. and published in Comput. Graph. Forum 24 (2005) 547-555.

The following HLSL code may be used to specify the choice of features (as described above).

```
struct Parameters
{    // Encapsulates the variables for this kind of feature
     float4 Rect1;
     float4 Rect2;
     float4 Channel1;
     float4 Channel2;
     float4 Thresholds;
};
bool TestFeature(sampler2D Input, float2 TexCoord, Parameters Params)
{    // Evaluate the given Boolean feature test for the current input pixel
     float4 Sum1 = AreaSum(Input, TexCoord, Params.Rect1);
     float4 Sum2 = AreaSum(Input, TexCoord, Params.Rect2);
     float Response = dot(Sum1, Params.Channel1) - dot(Sum2, Params.Channel2);
     return Params.Thresholds.x <= Response && Response < Params.Thresholds.y;
}
```

The variables for the feature are encoded in the Parameters structure. The Boolean test for a given node and pixel is defined by the TestFeature method, which will be called by the evaluation and training procedures as necessary. The AreaSum function is described in a further HLSL code example given below. It will be appreciated that these features are described by way of example only and any feature set may be used e.g. any features that can be computed in a pixel shader independently at each input data point, (e.g. pixel differences or dot products for BSP (Binary Space Partitioning) trees).

Figure 9:
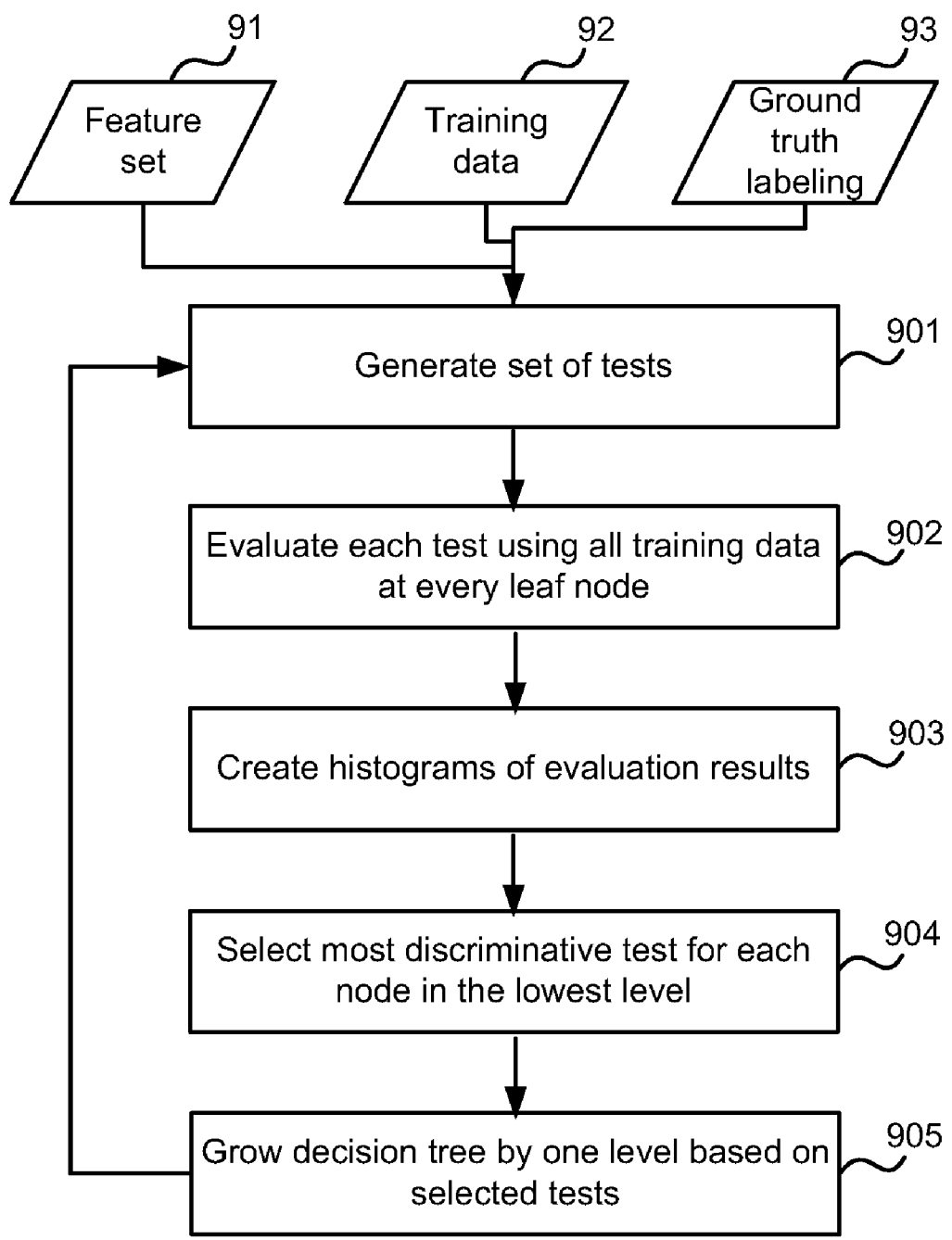
FIG. 9 is a flow diagram of a method of training a decision tree.

FIG. 9 is a flow diagram of a method of training a decision tree. Training of randomized trees is achieved iteratively, growing a tree by one level each training round. The method may be repeated to train multiple trees to form a decision forest. The inputs to the training process are a set of features 91, training data 92 and ground truth labeling for the training data 93. The set of features are those features which will be used in the Boolean tests within the decision tree (e.g. $\{R_0, R_1, c_0, c_1, \theta_0, \theta_1\}$ where R is a rectangle, c is a channel and $\theta$ is a threshold). For each training round (blocks 901-905), the set of candidate features is sampled to generate a number of tests (e.g. using a random number generator), and each of these tests are then evaluated on all the training data to assess their discriminative ability, i.e. each test is evaluated on each training input (e.g. on each training image for computer vision applications).

Figure 10:
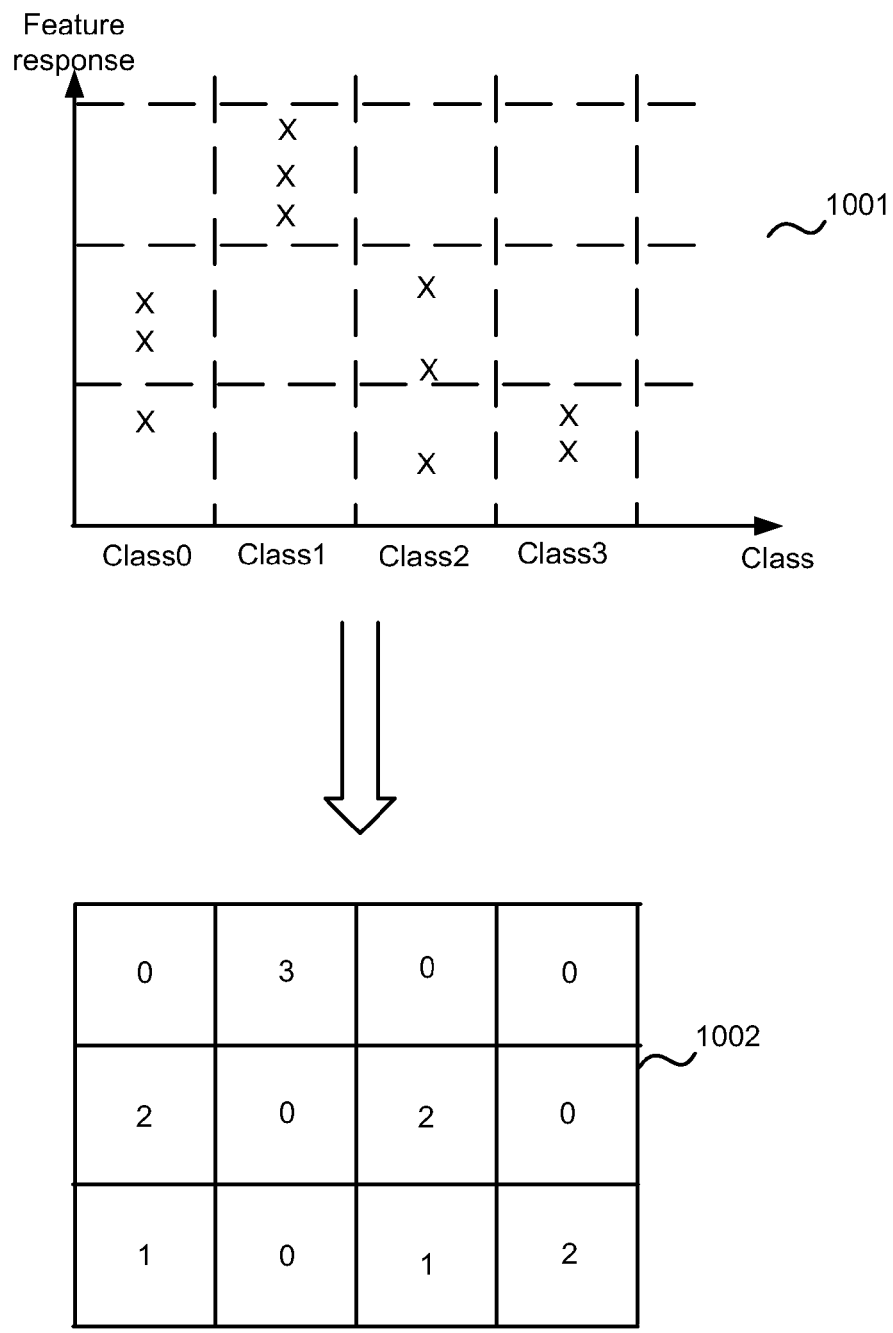
FIG. 10 shows a 2D representation of feature response against class and a 2D histogram for the quantized feature response.

As shown in FIG. 9, a set of tests are generated using the set of features 91 (block 901). The set of tests is common to all the leaf nodes in a single training round. In the first training round, the decision tree will comprise only a single node (the root node) and therefore there will be only one leaf node (i.e. one node in the lowest existing level of the decision tree). Each test is then evaluated using all the training data at every leaf node (block 902) in order to generate histograms. These histograms may, for example, be 4D histograms with the axes: node (or leaf node index), test (or candidate feature index), class (or ground truth label) and feature response. Feature responses are the results of applying the test at the node (prior to thresholding). The feature response may be quantized (e.g. into one or more feature response bins). A 2D representation 1001 of feature response against class (e.g. for a particular node and a particular test) is shown in FIG. 10. A 2D histogram 1002 for the quantized feature response (where three bins are used) is also shown.

The histograms which are generated (in block 903) may be used in conjunction with various learning algorithms, e.g. ID3 (as described in 'Induction of decision trees' by Quinlan, J. R and published in Machine Learning 1 (1986) 81-106) or C4.5 (as described in 'C4.5: Programs for Machine Learning' by Quinlan, J. and published by Morgan Kaufmann, California (1992)) to select the most discriminative test (or candidate feature, where a test relates to a single feature) for each node (or for at least one node) in the lowest existing level (block 904) and hence to add two new children to each leaf node (or to at least one leaf node) of the current tree (block 905) i.e. two children are added to each node on the lowest existing level. The process (blocks 901-905) may be repeated to add further levels until a defined depth is reached (e.g. eight levels) or until other criteria are satisfied (e.g. the decision tree sufficiently discriminates classes). The process may be used to train balanced or unbalanced decision trees.

In one sweep over the training database (in block 902) each labeled data point is visited and its response to each proposed test (which may relate to a single candidate feature or a combination of candidate features) is evaluated. The active leaf node in the tree is also determined and the appropriate histogram bin is incremented (e.g. as shown in the example of FIG. 10). Thus for each training round the discriminative ability of all tests (e.g. of all candidate features) is evaluated at all leaf nodes of the current tree.

Learning trees can be a highly computer-intensive task and the process can take weeks or months when implemented on a CPU. The most intensive steps are the evaluation of each test on all the training data (block 902) and the generation of the histograms (block 903). By implementing these steps on a GPU, the parallelism of the GPU can be exploited and the time taken to perform the training can be reduced significantly (e.g. by a factor of around 100).

Figure 11:
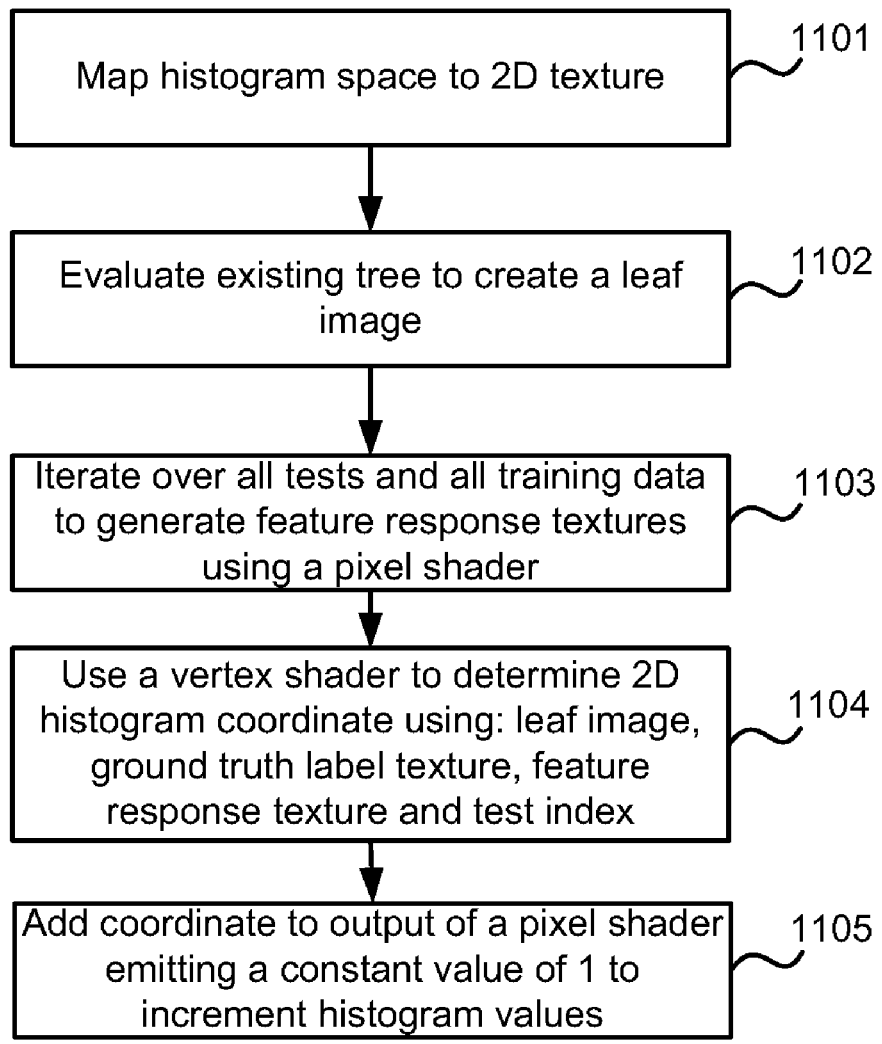
FIG. 11 is a flow diagram of an example method of implementing the test evaluation and histogram generation on a GPU.

FIG. 11 is a flow diagram of an example method of implementing the test evaluation and histogram generation (blocks 902-903) on a GPU. The histogram space (which may be a 4D histogram space: (leaf node index, test index, class, quantized feature response)) is mapped to a 2D texture (block 1101), where this 2D texture is referred to herein as the '2D histogram texture'. This mapping may be performed by tiling 2D slices through the histogram. The tiling strategy may be chosen dynamically at runtime to avoid exceeding any specified maximum texture width and height (e.g. maximum values of 4096). In some examples, a histogram (e.g. a 4D histogram) may be split across multiple 2D histogram textures. The size of this histogram is independent of the size of the training database.

The existing tree is then evaluated (e.g. as described above with reference to any of FIGS. 1-8) in order to generate a leaf image (block 1102). The leaf image represents the active leaf nodes of the current tree for the current training image. A pixel shader is then used to iterate over all the different tests for each collection of training data (e.g. for each training image) in order to generate 2D feature response textures (block 1103). This iteration may be sequential for each collection of data and for each test. A vertex shader is then used to perform the scattered write into the 2D histogram texture by generating a 2D histogram coordinate (block 1104). The coordinate is generated by the vertex shader based on a number of inputs, such as the leaf image (as generated in block 1102), the ground truth labeling (e.g. in the form of a ground truth label 2D texture), the feature response texture (as generated in block 1103) and the index of the particular test. The leaf image is calculated for each training example. The feature response texture is computed for each training input (e.g. for each training image) and for each test, whilst the test index is a constant for a particular test. A pixel shader emits a constant value of 1 and with additive blending, the 2D histogram texture values are incremented according to the 2D histogram coordinate (block 1105).

A specific example implementation of the method shown in FIG. 11 can be described with reference to the computer vision application detailed above. In this example, a 32-bit float texture is used for the 2D histogram texture. Having initialized the 2D histogram texture (in block 1101), the training database (which comprises a number of training images) is iterated through and all the feature responses are evaluated and accumulated into the histogram. As described above, in order to evaluate the feature discrimination for every leaf node of the tree simultaneously, a leaf image is used to determine which leaf of the current tree would be activated for each training data point. This leaf image is generated using a decision tree evaluation method (e.g. as described above) and the TreeLeaf output option.

Four training examples may be requested at a time from the database in order to take full advantage of the GPU's SIMD (Single Instruction Multiple Data) capabilities by operating on four texture components in parallel. Since in this example, the sRGB image data is pre-filtered (as described above), it is possible to either perform all the pre-processing on the training database in advance, or to apply the pre-processing as each image is fetched from the database. After the pre-filtering, the texture channels are rearranged so that each texture contains one filtered component from each of the four training examples. The input textures are thus prepared for evaluating the features efficiently.

The method then iterates through the supplied set of tests (which may also be considered the supplied set of candidate features in the situation where each test only refers to a single feature), computing the response of the current training examples to each test (as in block 1103). For each test two input textures are selected according to the channels specified in the test (i.e. the textures containing the appropriate channel of data as specified by the two channel indices in the feature test). Each box filter convolution is computed on four training images in parallel by passing the input texture to a pixel shader that performs the necessary look-ups on the integral image (the AreaSum shader as shown in the HLSL code example below). In a third pass, the two box filter responses are subtracted to recover the feature response. The leaf image (as generated in block 1102) also comprises four components that correspond to the four current training examples.

```
float4 AreaSum(uniform sampler2D Integral, in float2 TexCoord :
    TEXCOORD0, uniform float4 Rect) : COLOR0
{
    float4 tl = tex2D(Integral, TexCoord + float2(Rect.xy));
    float4 tr = tex2D(Integral, TexCoord + float2(Rect.zy));
    float4 br = tex2D(Integral, TexCoord + float2(Rect.zw));
    float4 bl = tex2D(Integral, TexCoord + float2(Rect.xw));
    return tl - tr + br - bl;
}
```

The computed feature responses are then accumulated into the 4D histogram (block 1104) using also the values of the leaf image and ground truth label at each pixel. Histogram accumulation is a scatter operation rather than a gather operation, so it is not implemented in a pixel shader and instead a vertex shader is used to perform the scattering. The vertex buffer input comprises a list of all the 2D texture coordinates which cover the area of the feature response image. An example of a vertex shader is provided in the HLSL code example below and this vertex shader uses the input coordinate to read the feature response value, ground truth label and leaf index at one position from three supplied input textures. The other value used in the histogram operation is the test (or feature) index which is passed in as a constant. The shader then computes the 4D-to-2D mapping according to the active tiling scheme (as described above). Finally the 2D histogram coordinate is output by the vertex shader. A pixel shader emits a constant value of 1 and, with additive blending enabled, the histogram values are incremented as desired. This pipeline is executed four times for the four channels of data to be aggregated into the histogram. A shader constant allows selection of the required channel.

```
float4 Scatter(uniform sampler2D Textures[3], uniform float4 select,
    in out float2 coord : TEXCOORD0, uniform float feature)
{
    float4 address = fcoord.x, coord.y, 0.0f, 0.0fg;
    float leaf = dot(tex2Dlod(Textures[0], address), select);
    float label = dot(tex2Dlod(Textures[1], address), select);
    float response = dot(tex2Dlod(Textures[2], address), select);
    float2 pos = Map4DTo2D(leaf, label, response, feature);
    return float4(pos.x, pos.y, 0.0f, 1.0f);
}
```

In order to histogram the real-valued feature responses these are first quantized. An interval of interest for response values may be provided for each test in the set of candidates. In the Scatter vertex shader (see code example above), the response interval is linearly mapped to the histogram bins, clamping to end bins (i.e. the real-valued responses in the range [min, max] are mapped to the discrete bins [0, bins-1]. Values less than min are mapped to bin 0. Values above max are mapped to bins-1). One approach is to use a large number (e.g. 20-30) of quantization levels during a training round and then to analyze the histogram in order to adaptively choose the threshold values to optimize the resulting child distributions. For example, the threshold values could be chosen to minimize the number of misclassified data points or to maximize the KL-divergence. Although this approach reduces training error, it may lead to over-fitting. Another approach is to use a very coarse quantization (e.g. only 2 or 3 bins) with randomized response intervals (where the response interval is the range of response values over which the bins are equally divided). This approach is less prone to over-fitting but may require more training rounds to become sufficiently discriminative.

In an example implementation the latter approach is used with the ID3 algorithm to select the test with the best information gain for every leaf node in each training round. This doubles the number of leaf nodes in a tree after each training round. In other examples, other learning algorithms and/or approaches to quantization may be used.

Figure 12:
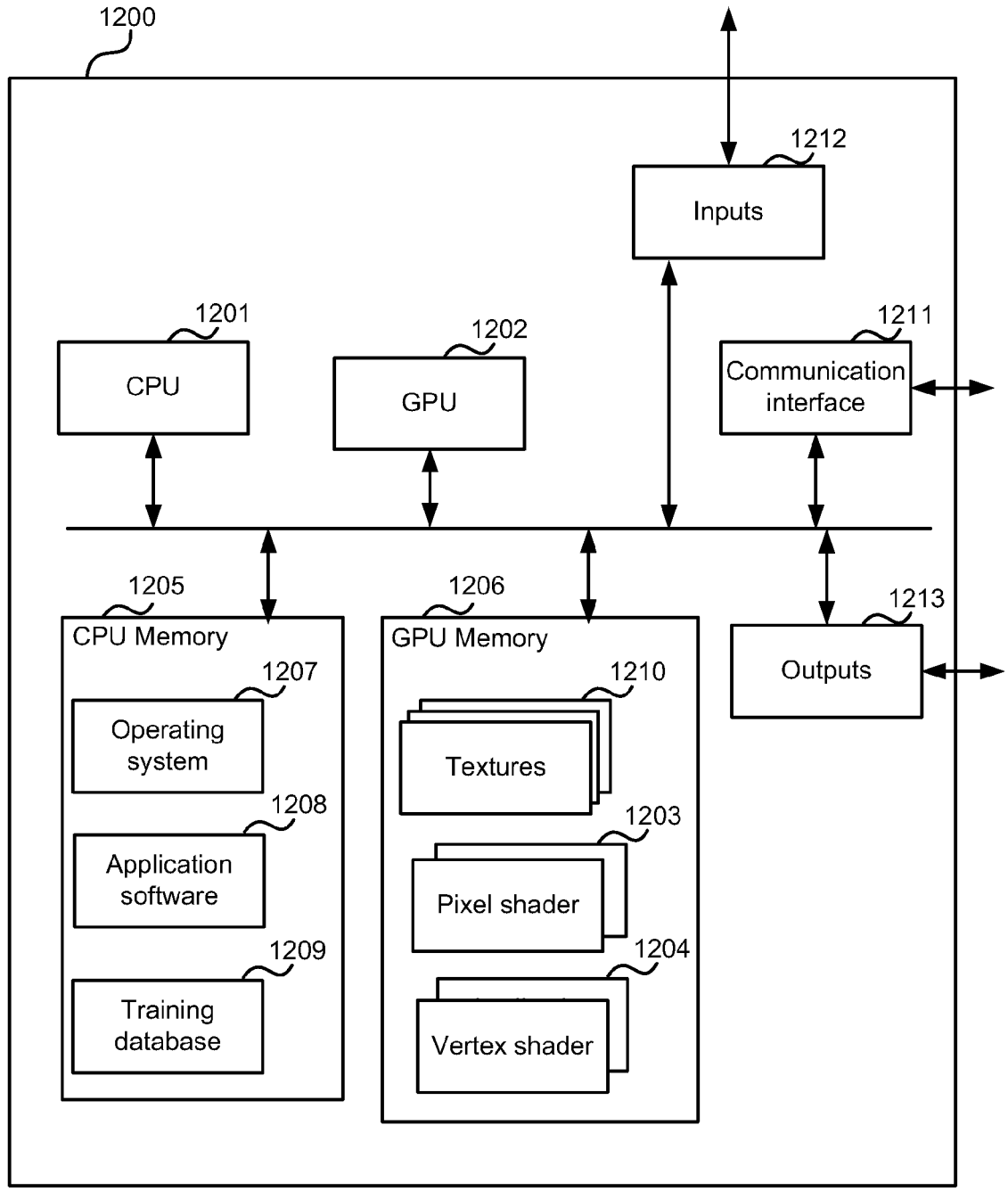
FIG. 12 illustrates an exemplary computing-based device in which embodiments of the methods described herein may be implemented. Like reference numerals are used to designate like parts in the accompanying drawings.

FIG. 12 illustrates various components of an exemplary computing-based device 1200 which may be implemented as any form of a computing and/or electronic device, and in which embodiments of the methods described above may be implemented.

Computing-based device 1200 comprises one or more CPUs 1201 and one or more GPUs 1202. These processors are arranged to process computer executable instructions to control the operation of the device in order to perform aspects of the methods described above. The GPU 1202 comprises one or more programmable stages.

The computer executable instructions may be provided using any computer-readable media, such as memory 1205, 1206. Separate memory may be provided which is associated with each of the CPU (memory 1205) and the GPU (memory 1206) or alternatively the memory may be combined or segmented in another way. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Platform software comprising an operating system 1207 or any other suitable platform software may be provided at the computing-based device to enable application software 1208 to be executed on the device. In the example shown in FIG. 12, the operating system 1207 and application software 1208 are stored in the CPU memory 1205 and one or more pixel shaders 1203 and one or more vertex shaders 1204 are stored in the GPU memory 1206. The memory 1205, 1206 may also be used to store the training database 1209 and the various textures 1210 which are required to perform the methods described herein. In the example shown in FIG. 12, the textures are stored in the GPU memory 1206 and the training database is stored in the CPU memory 1205.

The computing-based device may also comprise a communication interface 1211, one or more inputs 1212 (e.g. which are of any suitable type for receiving media content, Internet Protocol (IP) input, user input signals etc) and one or more outputs 1213. In an example, an output 1213 may comprise an audio and/or video output to a display system integral with or in communication with the computing-based device 1200. The display system may provide a graphical user interface, or other user interface.

Although the above description refers to use of pixel shaders and vertex shaders, these are examples of kernel procedures and other kernel procedures may alternatively be used. The methods may be used where a graphics API (e.g. OpenGL or Direct3D) is used to program the GPU and/or where another API (e.g. Compute Unified Device Architecture (CUDA)) is used. Use of different APIs may set different requirements on the format of the forest texture and/or the input data.

Whilst many of the examples described above relate to the use of decision trees for object class recognition, this is just one example of a suitable application. The methods described herein may be used for other computer vision applications (e.g. segmentation, gesture recognition, visual codebook generation, image distance estimation, image classification and person identification) and for non-computer vision applications, such as approximate nearest-neighbors and classification.

All the examples above refer to binary trees. Non-binary decision trees are possible but not usual. However, as non-binary decision trees can be re-written as binary trees the methods described herein are applicable to any decision tree.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computing device arranged to evaluate a decision tree comprising:
   device-executable instructions which when executed cause a processor to convert a decision tree structure into a first texture; and
   a Graphics Processing Unit comprising a kernel procedure arranged to:
   access the first texture and a second texture comprising an array of input data points;
   iterate through the first texture for each input data point in parallel; and
   generate an output texture comprising an evaluation result for each input data point.

2. A computing device according to claim 1, wherein said first texture comprises a row representative of each node in the decision tree structure, and wherein each row comprises at least one of: an identifier for a child node, a leaf node index and a plurality of feature parameters defining a binary test associated with said node.

3. A computing device according to claim 2, wherein said first texture further comprises a row representative of each node in a second decision tree structure, and wherein each row comprises at least one of: an identifier for a child node, a leaf node index and a plurality of feature parameters defining a binary test associated with said node.

4. A computing device according to claim 2, wherein iterating through the first texture for each input data point in parallel comprises:
   initializing a node coordinate to a first row in the first texture;
   reading the plurality of feature parameters at the node coordinate;
   performing the binary test using at least one input data point selected based on said plurality of feature parameters;
   updating the node coordinate according to a result of the binary test; and
   repeating the reading, performing and updating steps if the updated node coordinate corresponds to a row comprising an identifier for a child node.

5. A computing device according to claim 4, wherein iterating through the first texture for each input data point in parallel further comprises:
   if the updated node coordinate does not correspond to a row comprising an identifier for a child node, updating a temporary variable based on at least one element in said row; and
   if said first texture comprises data representative of a second decision tree structure, updating the node coordinate to a position of a row representative of a first node in the second decision tree; and repeating the reading, performing and updating steps if the updated node coordinate corresponds to a row comprising an identifier for a child node.

6. A computing device according to claim 1, further comprising:
   device-executable instructions which when executed cause a processor to convert input data into said second texture.

7. A computing device according to claim 6, wherein said input data comprises input data points having more than four components and wherein said device-executable instructions which when executed cause a processor to convert input data into said second texture comprise device-executable instructions which when executed cause a processor to:
   divide the more than four components into groups of components, each group comprising a maximum of four components;
   represent each input data point as a plurality of data points in said second texture, each of the plurality of input data points corresponding to a group of components; and
   modify coordinates in said first texture to address one of said plurality of data points in said second texture.

8. A computing device according to claim 1, wherein said array of input data points comprises an input image and wherein the evaluation result for each input data point comprises one of a leaf node index, a classification label for the input data point and a probability distribution across a plurality of classification labels for the input data point.

9. One or more memories with device-executable instructions for performing steps comprising:
   generating a set of tests for leaf nodes in a decision tree;
   evaluating, on a GPU, the set of tests at each leaf node using a set of training data;
   creating, on a GPU, a histogram of evaluation results;
   selecting a most discriminative test for at least one leaf node using the histogram; and
   adding two child nodes to said at least one leaf node in the decision tree, wherein the device-executable instructions for evaluating each of the set of tests comprises a first kernel procedure and wherein the device-executable instructions for creating the histogram comprises a combination of kernel procedures including a scatter operation.

10. One or more memories according to claim 9, further comprising a third kernel procedure arranged to:
    access a first texture representative of the decision tree and a second texture comprising an array of data points from the set of training data;
    iterate through the first texture for each data point in parallel; and
    generate an output texture comprising a leaf node index for each data point.

11. One or more memories according to claim 10, wherein said first texture comprises a data representative of each node in the decision tree, and wherein the data representative of each node comprises at least one of: an identifier for a child node, a leaf node index and a plurality of feature parameters defining a binary test associated with said node.

12. One or more memories according to claim 9, wherein the first kernel procedure is arranged to:
    generate a texture comprising responses for each array of data points in the set of training data and for each of the set of tests.

13. One or more memories according to claim 9, wherein the combination of kernel procedures including a scatter operation is arranged to:
    compute a 2D histogram coordinate for each test based on a leaf node index for each data point in an array of data points, a classification for each data point and a test response for each data point; and
    increment a value in a 2D representation of the histogram based on the 2D histogram coordinate.

14. One or more memories according to claim 9, wherein said set of training data comprises a plurality of training images.

15. A method of object classification using a GPU comprising:
    converting a decision tree structure into a 2D texture;
    initiating a kernel procedure in a GPU at each pixel in an input image; and
    using the kernel procedure to iterate through the 2D texture in parallel for each pixel in the input image and to generate an evaluation output comprising a labeled image, said labeled image comprising object classification data for each pixel in the input image.

16. A method according to claim 15, wherein said object classification data comprises one of an object label and a probability distribution over a plurality of object labels.

17. A method according to claim 15, wherein said 2D texture comprises a row representative of each node in the decision tree structure, and wherein each row comprises at least one of: an identifier for a child node, a leaf node index and a plurality of feature parameters defining a binary test associated with said node.

18. A method according to claim 17, wherein each row further comprises output data comprising one of an object label and a probability distribution over a plurality of object labels.

19. A method according to claim 17, wherein using the kernel procedure to iterate through the 2D texture in parallel for each pixel in the input image comprises:
    setting a node coordinate to a first row in the 2D texture;
    reading the feature parameters at the node coordinate;
    evaluating the binary test on pixels in the input image;
    updating the node coordinate based on a result of the binary test; and
    repeating the reading, evaluating and updating steps until the node coordinate points to a row comprising a leaf node index.

20. A method according to claim 19, wherein using the kernel procedure to iterate through the 2D texture in parallel for each pixel in the input image and to generate an evaluation output comprising a labeled image further comprises:
    outputting one of a leaf node index and a probability over a plurality of object labels.

* * * * *